Figure 2:
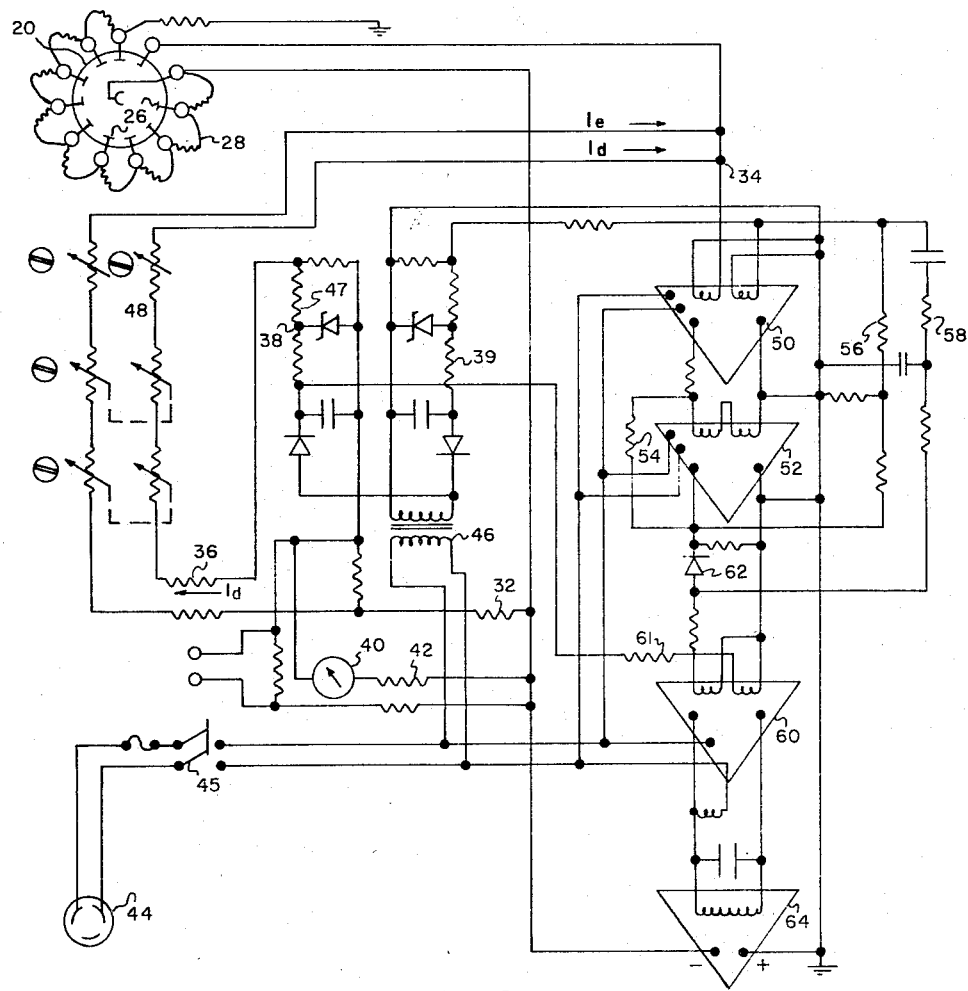

Sept. 27, 1966     G. R. MOFFITT, JR., ETAL     3,275,833
CONSTANT CURRENT SYSTEM FOR PHOTOELECTRIC MULTIPLIER TUBE
Filed Dec. 6, 1962

INVENTORS
GUY R. MOFFITT JR.
MORRIS WEISS
BY
*Joseph Levinson*
ATTORNEY

United States Patent Office 3,275,833
Patented Sept. 27, 1966

3,275,833
CONSTANT CURRENT SYSTEM FOR PHOTO-
ELECTRIC MULTIPLIER TUBE
Guy R. Moffitt, Jr., Norwalk, and Morris Weiss, Stamford,
Conn., assignors to Barnes Engineering Company, Stamford, Conn., a corporation of Delaware
Filed Dec. 6, 1962, Ser. No. 242,720
2 Claims. (Cl. 250—207)

This invention relates to a constant current circuit, and more particularly to a circuit for automatically adjusting the dynode voltage to a photoelectric electron multiplier tube which is utilized in a radiation thermometer.

In an application Ser. No. 132,790, now Patent No. 3,161,775, for a radiation thermometer filed Aug. 21, 1961, by Morris Weiss, a joint inventor of the present application, there is disclosed a radiometer capable of measuring temperature relatively independent of emissivity over a wide temperature range. Since emissivity changes greatly, especially at high temperatures, it was heretofore difficult to accurately measure high temperature using radiation methods. The aforesaid radiometer utilizes the principle that the radiation level of an object whose temperature is to be measured is proportional to an increasing power of temperautre, while at the same time it always remains proportional to the first power of emissivity. Accordingly, by suitably selecting a wave length of radiation for a given temperature which provides a radiation level far more sensitive to changes in temperature than to emissivity, it is possible to compensate for large changes in emissivity utilizing small changes in temperature.

In the aforesaid application the photomultiplier device is operated at a substantially constant anode current by manually controlling the dynode voltage on the device. By operating the photomultiplier tube in this mode, the hot surface temperature to be measured bears a logarithmic relationship to the dynode voltage which can be calibrated on a meter for a direct reading of temperature therefrom. It would be most convenient to be able to vary the dynode voltage automatically in response to a change in incident radiation on the photomultiplier tube.

Accordingly, it is an object of this invention to provide a new and improved circuit for automatically adjusting the dynode voltage on a photomultiplier tube in response to changes in incident radiation thereon.

Another object of this invention is to provide a closed loop amplifier circuit which generates a high voltage for the dynode of a photomultiplier tube automatically in response to radiation changes to maintain a constant anode current on the photomultiplier tube.

In carrying out this invention in one illustrative embodiment thereof a photomultiplier tube is operated at a substantially constant anode current by controlling the high voltage applied to the dynode electrodes of the photomultiplier tube. This is accomplished automatically by providing a source of reference current which is compared continuously with the anode current of the photomultiplier tube at a current summing junction. The summing junction error current is amplified by a direct current amplifying means for converting the small error signal into a high voltage which is applied to the dynode electrodes of the photomultiplier tube to maintain the anode current of the photomultiplier tube at a substantially constant level.

Figure 1:
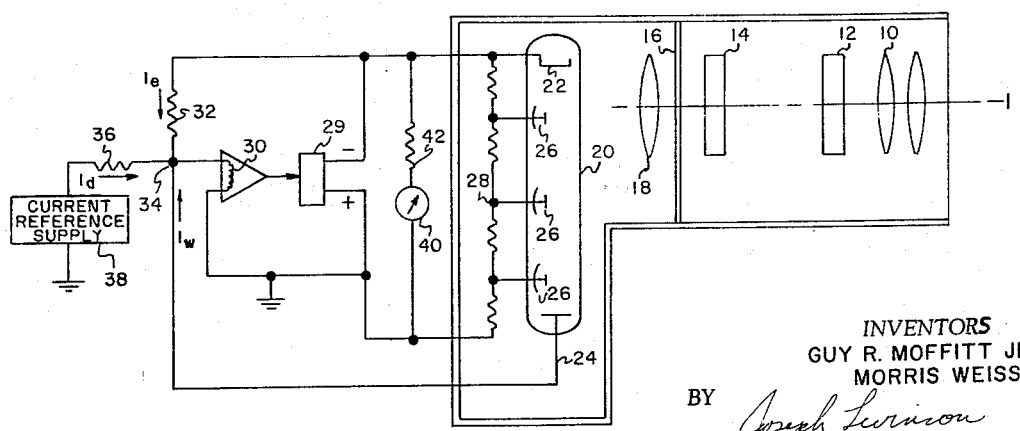

The invention, both as to organization and method of operation, together with further objects and advantages thereof, may best be understood by reference to the following description taken in connection with the following drawings, in which:

FIG. 1 is a schematic diagram in block form of the constant current circuit embodied in this invention as utilized in a radiation thermometer and FIG. 2 shows a schematic diagram of a specific form of the circuit shown in FIG. 1.

Referring now to FIG. 1, there is shown a radiometer for measuring high temperatures which includes an optical section comprising a doublet lens 10, a pair of narrow band transmission filters 12 and 14, a field stop 16, a field lens 18 and a photo-emissive cathode 22 of a photomultiplier tube 20, all in optical alignment. The doublet lens 10 images the object whose temperature is to be measured through the filters 12 and 14 on the field stop 16 which determines the field of view of the instrument. The filters 12 and 14 determine the wave length of the radiant energy which is to be passed by the optical system. The field lens 18 directs the energy which has been passed by the filters 12 and 14 and the field stop 16 on the photo-emissive cathode 22 of the photomultiplier tube 20.

The electronic portion of the radiometer includes the photomultiplier tube 20 which also has an anode 24 and a plurality of dynodes 26 which are connected across a voltage divider 28. The voltage divider 28 is connected to the photo-emissive cathode on one end thereof, and to a source of reference potential on the other end thereof. The photo-emissive cathode 22 is connected through a resistor 32 to a current summing junction 34. A current reference source 38 is applied via a resistor 36 to the current summing junction 34 and its output connected across the voltage divider 28. The amplifier means 30 functions to convert a small error current or signal received from the current summing junction 34 into a high alternating current voltage which is supplied to a rectifier 29 for supplying a high direct current voltage to the dynodes 26. A resistor 42 and a meter 40 which is calibrated for correct temperature readings are also connected across the voltage divider 28.

The photomultiplier tube 20 is operated at a constant anode current $I_w$ by controlling the voltage applied to the dynode electrodes 26. By operating with a constant anode current which is small, for example in the 10 microampere range, a definite stable relationship exists between the hot surface temperature of the object whose temperature is to be measured and the dynode voltage. This relationship is:

$$1/T = \alpha + \beta \operatorname{Log}_{10} E$$

where alpha and beta are constants. By suitable calibrating the panel meter 40 in accordance with this relationship, a direct reading of temperature is provided. The circuit of FIG. 1 provides a closed loop amplifier which automatically adjusts the dynode voltage in accordance with a change in radiant energy on the photo-emissive cathode 22 corresponding to a temperature of the object whose temperature is to be measured. The anode current $I_w$ is continuously compared to the reference current $I_d$ generated by the current reference supply 38 at the current summing junction 34. The reference current $I_d$ is always larger than the anode current $I_w$. As the anode current increases, $I_w$ approaches $I_d$ which would reduce the error signal $I_e$ to reduce the high voltage since the summing junction error current is amplified to generate the high voltage for the dynode electrodes 26. For exemple, when the hot surface temperature of the object to be measured increases, the radiation received by the photo-emissive cathode 22 increases, producing an increase in anode current and a decrease in error current. The reduced summing junction error current is amplified and generates a dynode voltage of decreased value maintaining essentially constant anode current. Conversely, when the hot surface temperature of the object decreases, the dynode voltage is automatically increased by the closed loop amplifier circuit to maintain a constant anode current operation. The amplifier or conversion means 30 is characterized by being able to produce a wide voltage range from a small change in error signal. In operation a small signal error is always present, providing a continuous change in dynode voltage. Under conditions of no received radiation or if radiation is interrupted for some reason a stabilizing signal or return current $I_e$ will prevent the dynode voltage from rising to a point where the photomultiplier tube 20 would be ruined.

FIG. 2 is a detailed schematic of one form of circuit which could be utilized in practicing the invention as shown in FIG. 1. In this form a source of line voltage 44 is applied via a switch 45 to a transformer 46 in the current reference supply 38. The reference current $I_d$ is generated by the reference current supply 38 by a zener diode 47. The return current $I_e$ is developed across a resistor 32 for the purpose of stabilizing the closed loop and for preventing the dynode voltage to become excessive when radiation is off due to either the blocking of the field in view or to temperatures below the threshold temperature of the radiometer. The reference current $I_d$ and the return current $I_e$ flow through a ganged section of resistances 48 before being applied to the current summing junction 34. The gang section of resistances 48 are provided for the purpose of having $I_e$ track with $I_d$ when the reference current is changed to provide a means of adjusting the summing junction error signal. The anode current $I_w$ is applied to the current summing junction 34 from which an error signal is applied to a magnetic amplifier 50. The magnetic amplifier 50 is cascaded with a magnetic amplifier 52 with positive or regenerative feedback as provided therebetween by a feedback resistor 54. A fixed bias is also applied to magnetic amplifier 50 from the current reference source 39. Also applied to the input of the first magnetic amplifier 50 are a portional stabilizing return current through a resistor 56 and another stabilizing return current which is fed through a series resistance-capacitance circuit 58, which filters out carrier current. The direct current output from magnetic amplifier 52 is fed to a third magnetic amplifier 60 through a diode 62 to insure that the signal to the third magnetic amplifier will be of correct polarity. The third magnetic amplifier output is fed to a high output voltage rectifier magnetic amplifier 64. A fixed bias which is supplied from the reference current supply 38 is fed by a resistor 61 into a separate input coil of the third magnetic amplifier 60 to reverse the polarity of the amplified signal. The fourth magnetic amplifier steps up and rectifies the output of amplifier 60 into a negative high voltage for supplying the dynodes 26 of the photomultiplier tube 20. The photomultiplier tube 20 includes a resistance divider to divide the high voltage supplied from the magnetic amplifier 64 equally between the dynode electrodes 26. In the embodiment shown the overall gain of the amplifying dynode stages is proportional to the 7.15 power of the high voltage. This allows the amplifying means 30, which includes the magnetic amplifier stages 50, 52, 60 and 64 to handle seven decades of radiant power between a temperature range of 1,000° C. to 2500° C. The output of the instrument described can be directly read on the meter 40.

The magnetic amplifiers shown in FIG. 2 are conventional. Although the invention is shown utilizing four magnetic amplifiers, it will be understood that more or less amplifier units might be utilized depending on the specific type of units employed and the particular environmental requirements. Furthermore, vacuum tube amplifiers could also be utilized. The only requirement on the amplifier means 30 is that it be able to take a small error current and convert it into a high voltage necessary for the dynodes of the photomultiplier tube.

The radiometer which has been described is capable of measuring temperatures relatively independent of emissivity over a wide temperature range in which emissivity presents a problem to temperature measurement. The instrument utilizes the steeply rising portion of the radiation versus temperature characteristic of the black body curves to provide a measurement very much more sensitive to variations in temperature than to emissivity in a manner described in the aforesaid application. By providing a closed loop amplifier circuit in which the anode current of a photomultiplier tube is held constant and is automatically and continuously compared with a reference signal, the dynode voltage of the photomultiplier tube is varied in accordance with temperature changes of the object whose temperature is to be measured. Accordingly, temperatures may be measured and seen immediately on a meter without any necessity for a manual adjustment.

Since other modifications varied to fit particular operating requirements and environments will be apparent to those skilled in the art, the invention is not considered limited to the examples chosen for purposes of disclosure, and covers all changes and modifications which do not constitute departures from the true spirit and scope of this invention.

What we claim is new and desire to secure by Letters Patent of the United States is:

1. A radiometer for measuring high temperatures comprising in combination a photomultiplier tube having a photo-emissive cathode, a plurality of dynodes, and an anode electrode, optical means for collecting and applying radiation from an object whose temperature is to be measured on said photo-emissive cathode, a current summing junction, means for connecting said anode electrode to said current summing junction for applying anode current thereto, a fixed current reference source substantially equal and opposite in sign with respect to a preselected operating anode current connected to said current summing junction, means for connecting said photo-emissive cathode to said current summing junction, magnetic amplifier means connected to said current summing junction for converting current difference signals into a high voltage supply, means for connecting said high voltage supply to said dynode electrodes whereby said anode current remains substantially constant by automatically varying the dynode voltage in response to radiation changes, and a meter connected across said high voltage supply which is calibrated to indicate temperature in response to changes in said high voltage.

2. A circuit for operating a photomultiplier device at a fixed anode current comprising a photomultiplier device having a cathode electrode, an anode electrode and a plurality of dynode electrodes, said photomultiplier device operating to cause an increase in anode current with increasing radiation on said cathode and a decrease in anode current on a reduction in radiation on said cathode, a source of reference current substantially equal and opposite in polarity to the preselected operating anode current of said photomultiplier tube, a current summing junction, means for applying said source of reference signal to said summing junction, means for applying said anode current to said summing junction, means for coupling said cathode and dynode electrodes to said current summing junction, magnetic amplifier means connected to said summing junction for receiving and converting an error signal from said summing junction into a high voltage and means for applying said high voltage to said dynode electrodes for maintaining said anode current substantially constant.

References Cited by the Examiner

UNITED STATES PATENTS

| | | | |
|---|---|---|---|
| 2,438,160 | 3/1948 | Green | 250—215 X |
| 2,583,132 | 1/1952 | Altar et al. | 250—207 X |
| 2,583,143 | 1/1952 | Glick | 250—207 |
| 2,412,423 | 12/1956 | Rajchman et al. | 250—207 |
| 3,003,065 | 10/1961 | Ketchledge | 250—207 |
| 3,042,805 | 7/1962 | Boersma | 250—207 |
| 3,102,202 | 8/1963 | Sweet | 250—207 |

RALPH G. NILSON, *Primary Examiner.*

WALTER STOLWEIN, *Examiner.*